(12) United States Patent
Khaimov

(10) Patent No.: US 10,924,542 B2
(45) Date of Patent: Feb. 16, 2021

(54) CONTENT DELIVERY SYSTEM

(71) Applicant: Verizon Patent and Licensing Inc., Basking Ridge, NJ (US)

(72) Inventor: Russell Khaimov, Howell, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 541 days.

(21) Appl. No.: 14/191,585

(22) Filed: Feb. 27, 2014

(65) Prior Publication Data

US 2015/0244769 A1  Aug. 27, 2015

(51) Int. Cl.
| | |
|---|---|
| H04L 29/08 | (2006.01) |
| G06F 9/50 | (2006.01) |
| G06F 9/455 | (2018.01) |
| H04L 12/24 | (2006.01) |
| G06F 9/48 | (2006.01) |
| H04L 12/803 | (2013.01) |

(52) U.S. Cl.
CPC .......... *H04L 67/1095* (2013.01); *G06F 9/485* (2013.01); *G06F 9/5055* (2013.01); *G06F 9/5077* (2013.01); *G06F 9/5083* (2013.01); *H04L 41/509* (2013.01); *H04L 41/5051* (2013.01); *H04L 47/125* (2013.01); *H04L 67/2814* (2013.01); *H04L 67/2842* (2013.01); *G06F 2009/45575* (2013.01)

(58) Field of Classification Search
CPC ... H04L 67/1095; H04L 67/02; H04L 41/509; H04L 41/5051; H04L 47/125; H04L 67/2814; G06F 2212/151; G06F 2212/152; G06F 9/5077; G06F 9/485; G06F 9/5083; G06F 9/455; G06F 2009/45575

USPC ........................................................ 709/217
See application file for complete search history.

(56) References Cited

U.S. PATENT DOCUMENTS

| | | | | |
|---|---|---|---|---|
| 8,190,593 | B1 * | 5/2012 | Dean | G06F 16/90335 707/707 |
| 9,176,764 | B1 * | 11/2015 | Jorgensen | G11C 7/1072 |
| 2002/0026560 | A1 * | 2/2002 | Jordan | G06F 9/505 711/120 |
| 2003/0065743 | A1 * | 4/2003 | Jenny | H04L 67/04 709/219 |
| 2006/0047751 | A1 * | 3/2006 | Chen | H04L 47/125 709/205 |

(Continued)

*Primary Examiner* — Emmanuel L Moise
*Assistant Examiner* — Xiang Yu

(57) ABSTRACT

A method may include starting a content delivery micro edge server module to generate a content delivery micro edge server on a web server. The content delivery micro edge server is a virtualized edge server associated with a service provider and the web server is associated with a host entity that is different than the service provider. The method may include partitioning web server capacity associated with the web server into the content delivery micro edge server and host entity assigned web server capacity. The method also includes activating at least one application associated with the content delivery micro edge server to provide content delivery services. The method includes registering, with the service provider, the content delivery micro edge server to provide content delivery services. The method further includes receiving a request for content to be provided to a client device, and delivering the content to the client device.

19 Claims, 8 Drawing Sheets

(56) References Cited

U.S. PATENT DOCUMENTS

| | | | |
|---|---|---|---|
| 2007/0250833 A1* | 10/2007 | Araujo, Jr. | G06F 21/6218 |
| | | | 718/1 |
| 2013/0246513 A1* | 9/2013 | Zaveri | G06F 3/067 |
| | | | 709/203 |
| 2013/0290506 A1* | 10/2013 | Astete | G06F 9/45533 |
| | | | 709/223 |
| 2014/0040885 A1* | 2/2014 | Donahue | G06F 9/485 |
| | | | 718/1 |
| 2014/0192677 A1* | 7/2014 | Chew | H04L 45/48 |
| | | | 370/254 |
| 2019/0163538 A1* | 5/2019 | Klein | G06F 9/505 |

* cited by examiner

CONTENT DELIVERY SYSTEM

BACKGROUND

Digital content and applications hosted on the Internet are placed on web servers. Service providers may operate the content delivery networks that deliver digital content and applications from content providers to user devices associated with customers of the content providers. A content provider may contract with the service provider (i.e., customer of the service provider) to provide digital content and applications to end users based on different payment arrangements and requirements for quality of service, as well as other content delivery metrics.

The service provider may provide content to customers via networks and edge servers. The edge servers may be located at distributed locations throughout the service provider network and host the applications and content associated with the content provider. The edge servers may allow the content provider to provide content and applications from edge servers that are closely located to the requesting computing device of the customer.

DETAILED DESCRIPTION OF PREFERRED EMBODIMENTS

The following detailed description refers to the accompanying drawings. The same reference numbers in different drawings may identify the same or similar elements.

Systems and/or methods described herein may provide content via a content delivery network that includes a plurality of content delivery micro edge servers hosted on multi-entity partitioned web servers. The content delivery micro edge server may be a virtualized instance of an edge server that is operated by a service provider. The multi-entity partitioned web server may be a host web server that is operated by a host entity, which is separate (and different) than the service provider. From the point of view of the host entity (e.g., systems associated with a webmaster for the host entity), the content delivery micro edge server may be observed as a single process that operates as a guest operating system on the host web server. The content delivery micro edge server may partition a defined portion of the unused web server and/or bandwidth capacity into a highly secure encrypted data space, which may only be managed, accessed and available to systems associated with the service provider.

The methods and systems may enable a service provider to operate a content delivery network marketplace in which host entities provide content delivery services via for content providers. The content delivery network marketplace may enable millions of existing webmasters with dormant web server capacity to participate in a highly secure revenue sharing marketplace for content delivery based on content delivery micro edge server deployed on underutilized web servers.

As used herein, the terms "webmaster," "host," "host entity," "third party administrator," and/or "hosting partner" may be used interchangeably. The terms "customer," "consumer," and/or "end user" may be used interchangeably. The terms "service provider," "provider," "administrator," "sales persons," and/or "provider enterprise" may also be used interchangeably. Also, the terms "webmaster," "host," "host entity," "third party administrator," "hosting partner," "customer," "consumer," "end user," "service provider," "provider," "administrator," and/or "content provider" are intended to be broadly interpreted to include a device or a user of a device that interfaces, is a component of or otherwise accesses or is accessed by systems described herein.

Figure 1:
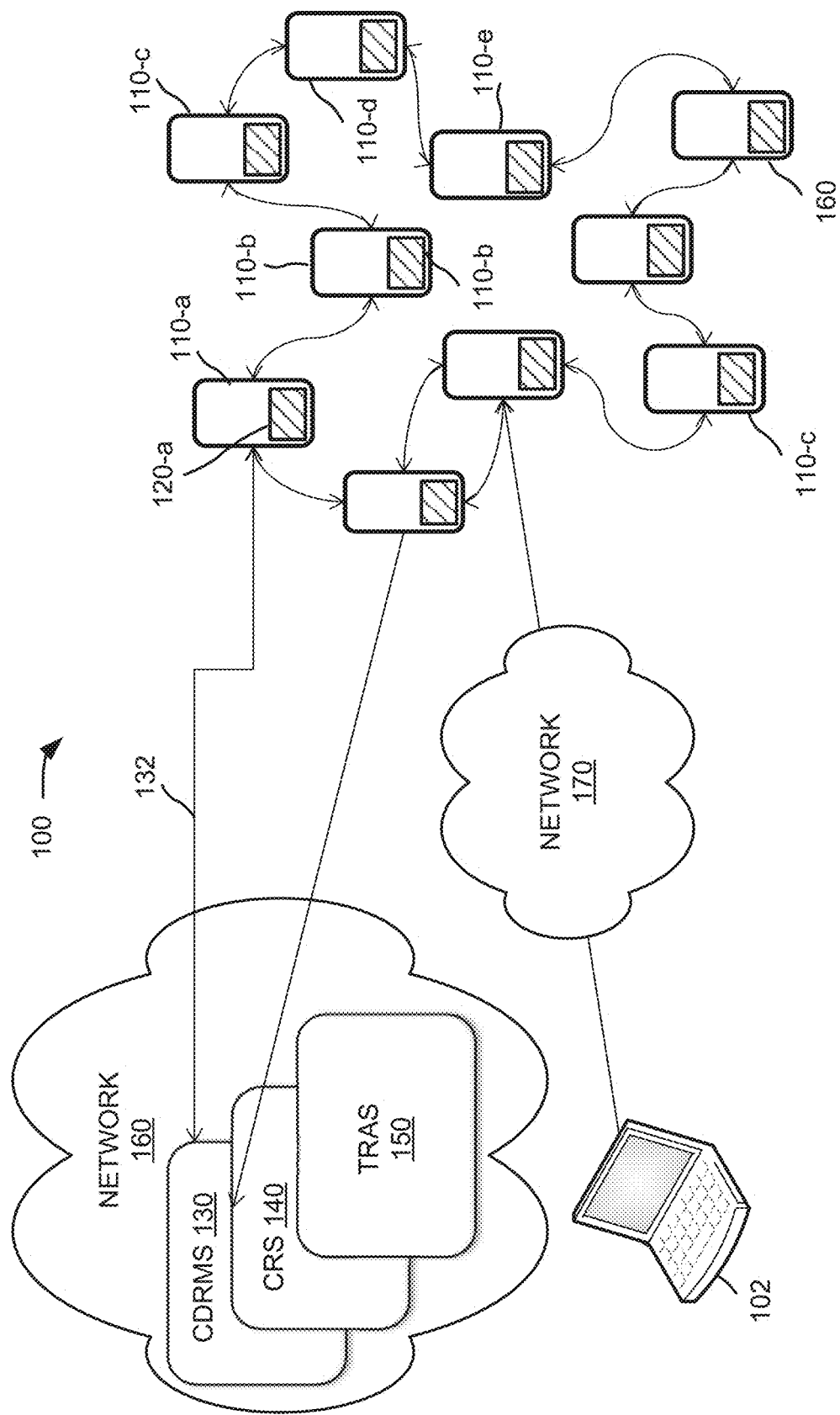
FIG. 1 is a diagram of an exemplary network in which systems and/or methods described herein may be implemented.

FIG. 1 is a diagram of an exemplary environment 100 in which systems and/or methods described herein may be implemented. As illustrated, environment 100 may include a client device 102, a plurality of multi-entity partitioned web servers 110-a to 110-k (collectively referred to as multi-entity partitioned web servers 110 or individually as multi-entity partitioned web server 110 (or alternatively web server 110)), a content delivery resource management server (CDRMS) 130, a content routing server (CRS) 140 and a transaction records and analysis server (TRAS) 150 interconnected by networks 160/170. Each of the multi-entity partitioned web servers 110 may include a corresponding content delivery micro edge server 120 (shown in FIG. 1 as content delivery micro edge servers 120-a to 120-k, collectively referred to as content delivery micro edge servers 120 or individually as content delivery micro edge server 120 (or alternatively micro edge server 120)).

Components of environment 100 may interconnect via wired and/or wireless connections. One client device 102, ten multi-entity partitioned web servers 110, one content delivery resource management server 130, one content routing server 140, one transaction records and analysis server 150 and three networks 160/170 have been illustrated in FIG. 1 for simplicity. In practice, there may be more client devices 102, multi-entity partitioned web servers 110 (and corresponding content delivery micro edge servers 120), content delivery resource management servers 130, content routing servers 140, transaction records and analysis servers 150 and networks 160/170. Also, in some instances, one or more of the components of environment 100 may perform one or more functions described as being performed by another one or more of the components of environment 100.

Client device 102 may include any device capable of communicating via a network, such as network 170. Client device 102 may include an interactive client interface, such as a graphic user interface (GUI). Client device 102 may include digital rights management (DRM) functionality to retrieve security information (e.g., decryption keys) and decrypt protected content received from (or via, or in association with) multi-entity partitioned web server 110. Examples of client device 102 may include a mobile phone, a tablet, a personal computer, or another device that may receive content and/or applications, such as content and applications from content delivery micro edge servers 120 hosted at multi-entity partitioned web servers 110 as described herein, and provide (or use) the content and/or applications at client device 102.

Multi-entity partitioned web servers 110 may include web servers operated by a host entity or entities (e.g., web masters, data warehouses, etc.), such as described herein below with respect to FIG. 3. Host entity may be a different organization than the service provider. Different multi-entity partitioned web servers 110 or groups of multi-entity partitioned web servers 110 may be operated by different host entities. Each of the multi-entity partitioned web servers 110 may include web server capacity utilized by the host entity for the particular multi-entity partitioned web server 110. Multi-entity partitioned web server 110 may include web server capacity and bandwidth capacity that is unused by the host entity.

A predetermined portion of the unused capacity of multi-entity partitioned web server 110 may be partitioned into a highly secure encrypted data space, referred to herein as a content delivery micro edge server 120, which may be managed by and only available to the service provider, such as described herein below with respect to FIG. 4. Content delivery micro edge server 120 may be a virtualized edge server that is associated with a service provider that contracts with the host entity to provide content delivery services via content delivery micro edge server 120. Content delivery micro edge server 120 may include a cache of content and/or applications that is associated with a content provider customer of the service provider.

Although only content delivery resource management server 130, content routing server 140 and transaction records and analysis server 150 are shown in FIG. 1, these servers 130/140/150 may be part of a service provider system associated with a telecommunications service provider. For example, the service provider may be a service provider that provides content delivery services and operates a content delivery network market place in which host entities may provide access to content delivery services via content delivery micro edge servers 120 partitioned on multi-entity partitioned web servers 110. Content providers may provide content and applications via the micro edge servers 120 partitioned on the web servers 110. The service provider system and the websites operated via the service provider system may allow World Wide Web consortium (WC3) compliant client devices 102 to access content on the content delivery micro edge servers 120.

Content delivery resource management server (CDRMS) 120 may manage content delivery resources, including content delivery resources associated with content delivery micro edge servers 120, such as described below with respect to FIG. 5. Content delivery resource management server 120 may be a scalable system, which may be designed to monitor the health of each content delivery micro edge server 120, maintain awareness of global resource capacity (i.e., the total content delivery resources and location of each content delivery micro edge server 120), and provide a conduit to push new updates, upgrades, remote commands, etc., to the content delivery micro edge servers 120. Content delivery resource management server 120 may manage the content delivery micro edge servers 120 via out of band communication sessions 132 based on a dedicated management channel for the content delivery micro edge servers 120.

Content routing server (CRS) 140 may include one or more server devices, or other types of computation or communication devices, that may route requesting client devices 102 to a best cost route (on the basis of transmission control protocol (TCP) latency) content delivery micro edge server 120 for requested content or applications, such as described herein below with respect to FIG. 6. Content routing server 140 may include a routing matrix and may receive, determine and/or store a last identified state of each content delivery micro edge server 120 (e.g., in terms of connectivity per session) in association with the routing matrix. Content routing server 140 may identify particular content and applications stored in each of the content delivery micro edge servers 120.

Transaction records and analysis server (TRAS) 140 may store information that may be used to analyze transactions between client devices 102 and content delivery micro edge servers 120, such as described herein below with respect to FIG. 7. Transaction records and analysis server 140 may store hypertext transfer protocol (HTTP) header and payload information (associated with interactions between client device 102, content delivery micro edge servers 120, service provider system, etc.) for reporting purposes. Transaction records and analysis server 140 may also store data regarding network transactions associated with content providers, host entities, and the service provider (e.g., a request for particular content associated with a particular content provider that is fulfilled by a particular content delivery micro edge server 120 associated with a particular hosting entity). Transaction records and analysis server 140 may function as a long term data warehouse for extended periods of time (and/or multiple series of transactions) in environment 100.

Networks 160/170 may include a LAN, a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks. Devices using networks 160/170 may be connected via wired (e.g., Ethernet, coaxial cable, etc.) or wireless connections (e.g., using network devices such as those available under the IEEE 802.11 wireless LAN standards). Network 160 may be a core network for a service provider system that includes servers 130/140/150. Networks 160/170 may include delivery network infrastructures that support particular applications, protocols and standards, such as web real time communications (webRTC) applications, other real time streaming technology, flash media server, etc.

Although FIG. 1 shows exemplary components of environment 100, in other implementations, environment 100 may contain fewer components, different components, differently arranged components, or additional components than depicted in FIG. 1.

In implementations described herein, systems and methods may enable encrypted content delivery network (CDN) capacity on the web servers of third parties for a service provider to provide web services (associated, in some instances, with secondary parties, such as content providers) to requesting client devices. The systems and methods may allow a CDN marketplace in which web masters, for the third party web servers, monetize underutilized capacity of the third party webs servers in a profit sharing arrangement. The service provider may partner with third party data centers and provide enhanced content delivery services while maintaining control and integrity/security of data and applications associated with client devices and the content provider.

Figure 2:
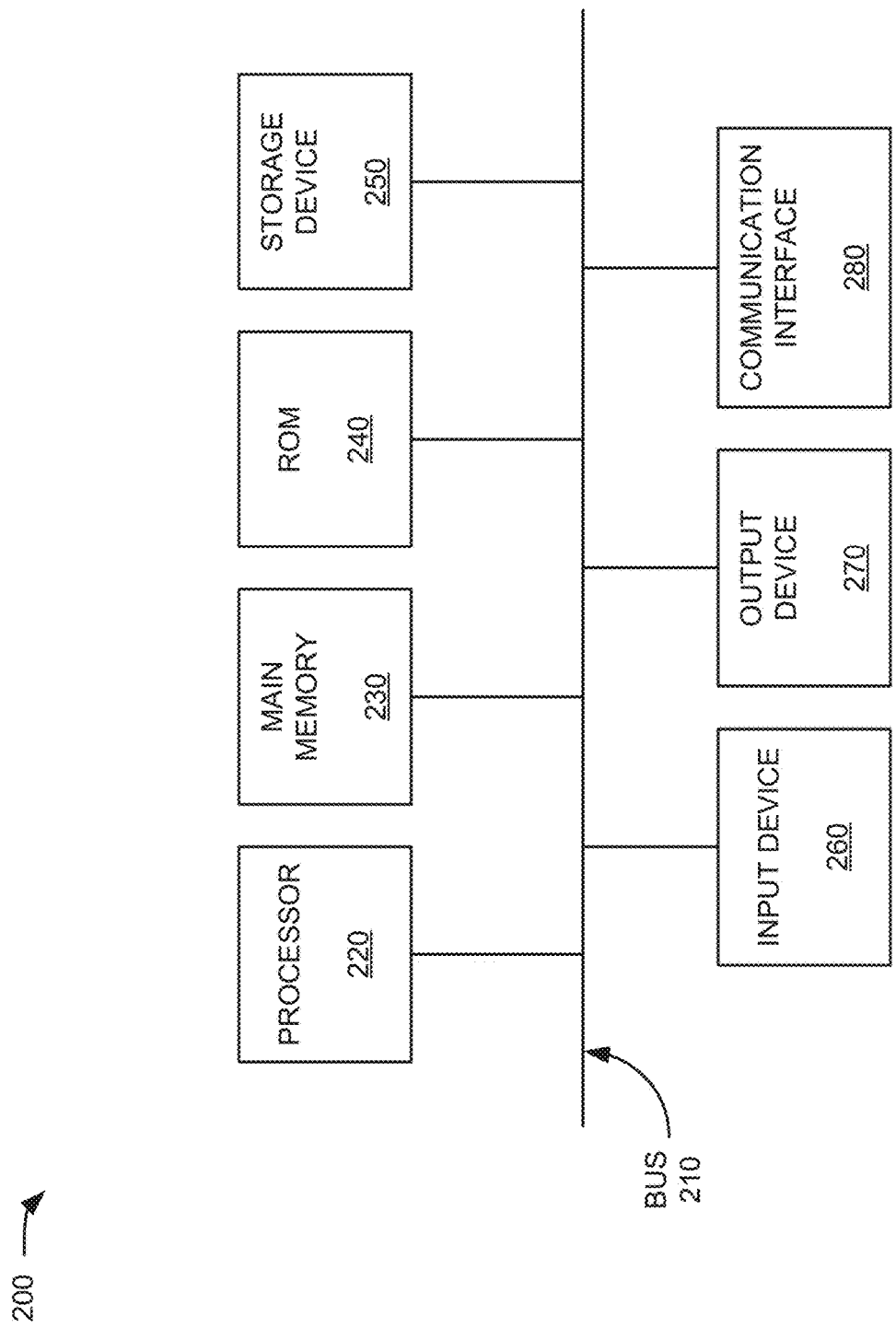
FIG. 2 is a diagram of exemplary components of one or more devices of the network depicted in FIG. 1.

FIG. 2 is a diagram of exemplary components of a device 200 that may correspond to one or more devices of environment 100, such as client device 102, multi-entity partitioned web server 110, content delivery resource management server 130, content routing server 140, or transaction records and analysis server 150. As illustrated, device 200 may include a bus 210, a processor 220, a main memory 230, a read-only memory (ROM) 240, a storage device 250, an input device 260, an output device 270, and a communication interface 280. Bus 210 may include a path that permits communication among the components of device 200.

Processor 220 may include one or more processors, microprocessors, or other types of processing units that may interpret and execute instructions. Main memory 230 may include a random access memory (RAM) or another type of dynamic storage device that may store information and instructions for execution by processor 220. ROM 240 may include a ROM device or another type of static storage device that may store static information and/or instructions for use by processor 220. Storage device 250 may include a magnetic and/or optical recording medium and its corresponding drive.

Input device 260 may include a mechanism that permits an operator to input information to device 200, such as remote control 140, control buttons, a keyboard, a mouse, a pen, a microphone, voice recognition and/or biometric mechanisms, a touch screen, etc. Output device 270 may include a mechanism that outputs information to the operator, including a display, an indicator light, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processor 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
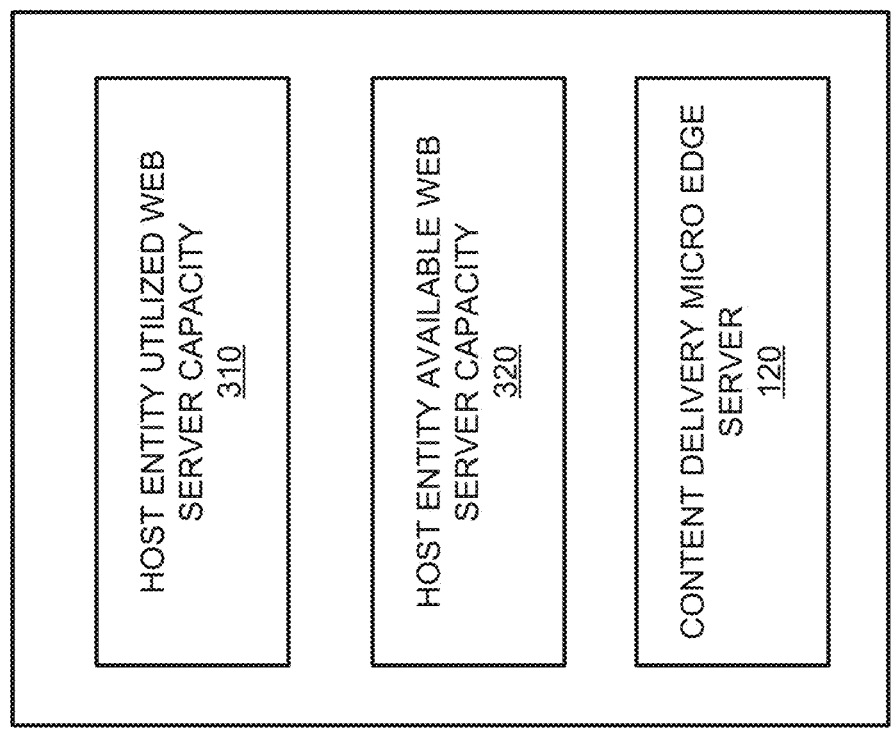
FIG. 3 depicts exemplary components of one of the multi-entity partitioned web servers depicted in FIG. 1.

FIG. 3 is a diagram of exemplary functional components of multi-entity partitioned web server 110. In one implementation, the functions described in connection with FIG. 3 may be performed by one or more components of device 200 (FIG. 2). As shown in FIG. 3, multi-entity partitioned web server 110 may include host entity utilized web server capacity 310, host entity available web server capacity 320, and content delivery micro edge server 120.

Multi-entity partitioned web server 110 may include a web server operated by a hosting company (or host entity, data center, etc.) that may also own multi-entity partitioned web server 110. For example, the hosting entity may be a third party data center (i.e., a third party to the service provider and content provider) that uses control panel software to manage web server capacity on a global scale. Multi-entity partitioned web server 110 may include capability to host digital content and applications (e.g., a website, HTML files, etc.). Multi-entity partitioned web server 110 may include capacity, such as random access memory (RAM) and other memory storage, processor speed, network utilization and storage, etc., that may facilitate the distribution of content and applications from multi-entity partitioned web server 110 to client devices 102 (or client applications). Multi-entity partitioned web server 110 may utilize appropriate web server technology to execute content delivery services.

A service provider may operate a CDN marketplace for providers of content delivery services. The host entity for multi-entity partitioned web server 110 may participate in the CDN marketplace and submit information to the service provider to include multi-entity partitioned web server 110 (or a portion of the capacity of multi-entity partitioned web server 110) in a content delivery network. For example, the host entity may navigate to a web page or other interfaces associated with the content delivery marketplace and enter information to establish a contractual relationship based on providing the content delivery micro edge server 120 on the host entity's web server. The host entity may receive an identifier and the multi-entity partitioned web server 110 may receive an additional identifier from the service provider (which may be stored in a database associated with the service provider). The host entity may also register to receive payment for content delivery services provided via the content delivery micro edge server 120.

Multi-entity partitioned web server 110 may include host entity assigned web server capacity and content delivery micro edge server 120, which may each be partitioned into their own spaces (e.g., web space) on multi-entity partitioned web server 110 and securely partitioned in their own existing environment. Host entity assigned web server capacity includes host entity utilized web server capacity 310 and host entity available web server capacity 320. In some embodiments, comingling of data allowed between host entity assigned web server capacity and content delivery micro edge server 120 is not permitted within multi-entity partitioned web server 110. More particularly, there is complete separation between host entity utilized web server capacity 310 and content delivery micro edge server 120.

Host entity utilized web server capacity 310 may include web server capacity that is utilized by the host entity for applications and content associated with (or managed) by the host entity. For example, the host entity may use the host entity utilized web server capacity 310 during the normal course of business/operation while operating a data center (e.g., for hosting websites, applications, etc., of (direct contractual) customers of the hosting entity).

Host entity available web server capacity 320 may include unused web server capacity on multi-entity partitioned web server 110 that is available to the hosting entity. For example, from the point of view of the host entity (i.e., systems and user interfaces associated with host entity), a total host entity web server capacity (i.e., web server capacity that is controlled by the host entity) may include the sum of host entity utilized web server capacity 310 and host entity available web server capacity 320. In instances in which the host entity utilized web server capacity 310 increases, the host entity available web server capacity 320 may decrease by the corresponding amount.

Content delivery micro edge server 120 may include dedicated space for content delivery services to be provided by the service provider. Content delivery micro edge server 120 may activate a security application that generates a secure and encrypted environment in the content delivery micro edge server 120. In some embodiments the multi-entity partitioned web server 110 may be preloaded with a capability to generate content delivery micro edge server 120. From the point of view of the host entity (i.e., systems associated with the host entity) the content delivery micro edge server 120 may appear to be a fixed single process. The fixed single process may appear to have dedicated encrypted SWAP space and, in some instances, to consume a fixed percentage of the content delivery resources of multi-entity partitioned web server 110. Content delivery micro edge server 120 may maintain control and integrity/security of data and applications associated with content delivery micro edge server 120 with regard to the host entity, host entity utilized web server capacity 310, host entity available web server capacity 320, client devices 102, the content provider (in some instances) and with additional outside parties.

According to an embodiment, multi-entity partitioned web server 110 may include a webRTC enabled web server that supports webRTC applications.

Figure 4:
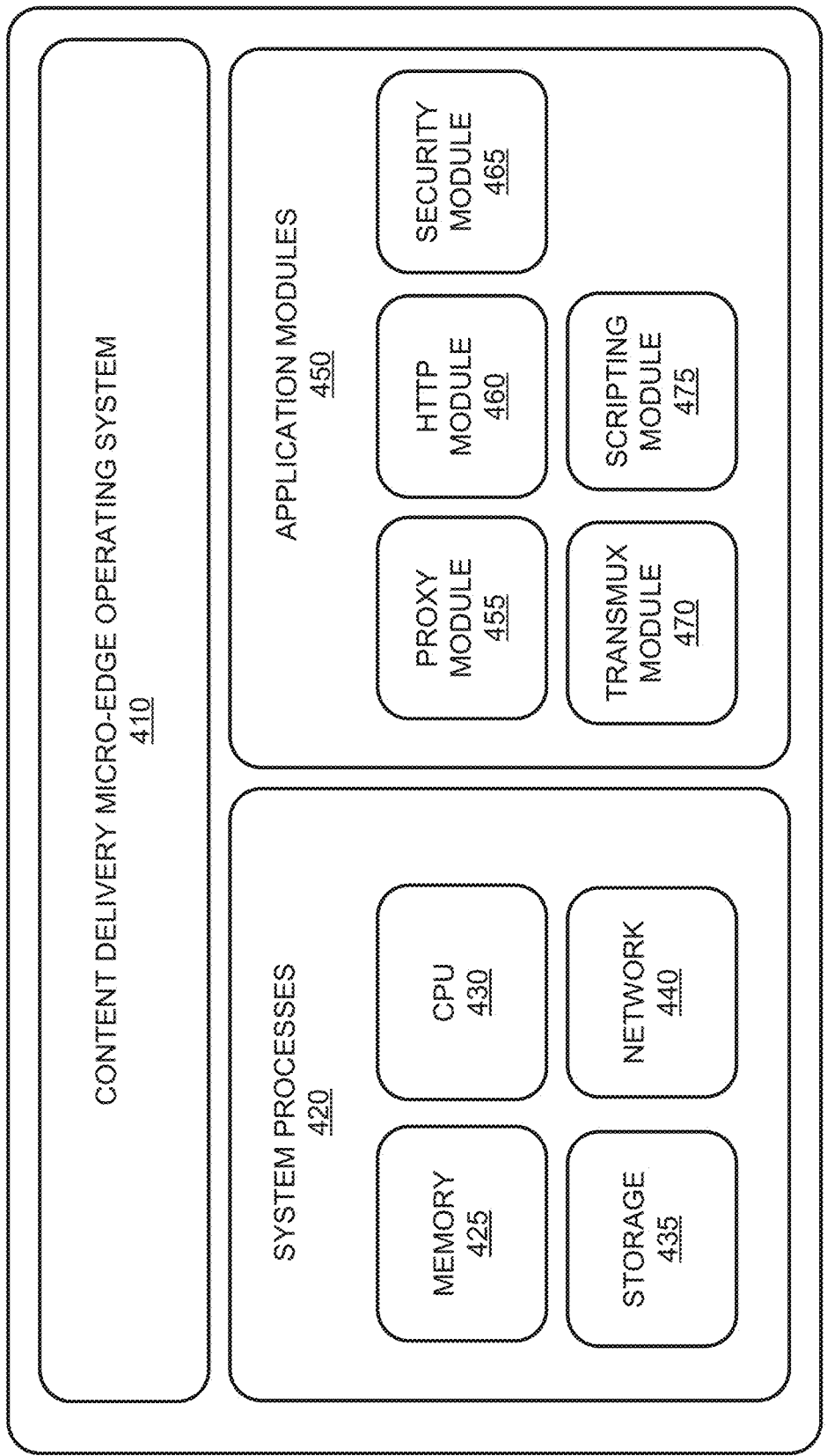
FIG. 4 is a functional block diagram of one of the content delivery micro edge servers of FIG. 3.

FIG. 4 is a diagram of exemplary functional components of content delivery micro edge server 120. In one implementation, the functions described in connection with FIG. 4 may be performed by one or more components of device 200 (FIG. 2). As shown in FIG. 4, content delivery micro edge server 120 may include a set of machine-readable instructions (a software stack), hosted on multi-entity partitioned web server 110, that includes content delivery micro edge server operating system 410, system processes 420, and application modules 450. System processes 420 may include (or utilize) computing resources in the web server that hosts content delivery micro edge server 120 including memory 425, central processing unit 430, storage 435, and network 440. Application modules 450 may include a proxy module 455, a HTTP module 460, a security module 465, a transcode multiplexing (transmux) module 470, and a scripting module 475. Although particular application modules 450 are shown in FIG. 4 by way of illustration, additional or different application modules 450 may be included in content delivery micro edge server 120.

Content delivery micro edge server 120 may be generated, downloaded and/or initiated on multi-entity partitioned web server 110 by the host entity in association with the service provider. For example, the host entity may communicate with service provider back end systems to obtain the software and/or authentication associated with content delivery micro edge server 120. Alternatively, the machine readable instructions to generate content delivery micro edge server 120 may be preloaded on multi-entity partitioned web server 110 (i.e., with the startup software for multi-entity partitioned web server 110).

In instances in which content delivery micro edge server 120 is initiated on multi-entity partitioned web server 110 (e.g., the host entity provides input instructions to start content delivery micro edge server 120), content delivery micro edge server 120 may be viewed by the host entity as a single process. Content delivery micro edge server 120 may expand the utilized portion of total capacity of multi-entity partitioned web server 110 to a predetermined level (e.g., of web server capacity and bandwidth capacity on multi-entity partitioned web server 110). After content delivery micro edge server 120 is initiated, content delivery micro edge server 120 may execute automated processes associated with content delivery or receive instructions from the service provider. The host entity may be limited to turning the content delivery micro edge server 120 either on or off and has no control or visibility into the content or applications that may be provided via content delivery micro edge server 120.

Content delivery micro edge server 120 may be a virtualized instance of an edge server for content delivery services that is implemented on multi-entity partitioned web server 110. Content delivery micro edge server 120 may include machine-readable instructions hosted in the assigned (otherwise dormant) capacity of a multi-entity partitioned web server 110 (i.e., a software component on multi-entity partitioned web server 110). Content delivery micro edge server 120 may include or comprise a virtualization environment (or layer) in which components are dedicated and isolated from other components not included in the virtualization environment. The virtualization environment may contain system processes 420, virtual memory 425, virtual CPU 430, virtual storage 435, and virtual network 440. Content delivery micro edge server 120 may also activate and control (or otherwise apply) application modules 450 within the virtualization environment for specific (and in some instances, immediate) CDN uses.

Content delivery micro edge server operating system 410 may be a guest operating system on a multi-entity partitioned web server 110. Content delivery micro edge server operating system 410 may be a separate operating system than any operating system associated with the host entity for multi-entity partitioned web server 110. Content delivery micro edge server operating system 410 may manage computing resources associated with providing content delivery from the content delivery micro edge server 120 to requesting client devices 102.

System processes 420 may include processes that execute the content delivery micro edge server 120. System processes 420 may be invisible (or indistinguishable) to host entity systems but may be monitored, in some instances, by systems associated with the service provider (e.g., CDRMS 130, CRS 140, etc.).

Memory 425, central processing unit 430, storage 435, and network 440 may be dedicated computing resources associated with content delivery micro edge server 120 (and unavailable to other operating systems (and/or) processes in multi-entity partitioned web server 110. Memory 425 may comprise random access memory dedicated to content delivery micro edge server 120. Central processing unit 430 may be a virtual CPU (VCPU) that is assigned to content delivery micro edge server 120. Storage 435 may be a dedicated portion of a non-transitory memory device. Storage 435 may include content and/or applications associated with a content provider that provides content to client devices 102 via the service provider and content delivery micro edge servers 120. Network 440 may include a portion of the total network resources available to multi-entity partitioned web server 110 that is dedicated to content delivery micro edge server 120.

Application modules 450 may include modules for specific processes that enable content delivery services, monitoring and protection of content (and content delivery) in a manner required by the service provider and content provider. Application modules 450 may initially include (on startup of the content delivery micro edge server 120) modules that are core to the operation of content delivery micro edge server 120 (such as, for example, proxy module 455, security module 465, etc.). Content delivery micro edge server 120 may later upgrade to include modules associated with delivering different particular types of content and applications (e.g., based on instructions received from the service provider).

Proxy module 455 may allow content delivery micro edge server 120 to act as a proxy (or an intermediary) for communication between client devices 102 and other devices in environment 100. HTTP module 460 may allow communication using HTTP for content delivery between content delivery micro edge server 120 and client devices 102. Security module 465 may comprise a security agent for securing the virtual content delivery micro edge server 120. Security module 465 may provide security for communications involving content delivery micro edge server 120. Transmux module 470 may provide capability to convert media files (content) to particular formats based on, for example, specifications of requesting client devices 102. Scripting module 475 may determine scripting frameworks for content delivery.

According to an embodiment, multiple content delivery micro edge servers 120 may be arranged in a swarm of content delivery micro edge servers 120. The swarm of content delivery micro edge servers 120 may function as replication middleware that allows sharing of content and/or applications across members of the swarm of content delivery micro edge servers 120 (based on consistency, network constraints, etc.). Alternatively, content delivery micro edge servers 120 may be arranged in a macro edge arrangement in which members of a group of content delivery micro edge servers 120 fulfill different functions of an overall "macro" server that includes all of the content delivery micro edge servers 120. For example, a particular content delivery micro edge server 120 may function as a content cache while another content delivery micro edge server 120 may provide an application requested by a particular client device 102.

According to an embodiment, each of the content delivery micro edge servers 120 may include a micro route matrix. The micro route matrix may determine a best cost route (for example based on TCP latency) for a client device 102 among a group of possible content delivery micro edge servers 120. The micro route matrix may determine the best cost route in conjunction with a master route matrix as described herein below with respect to FIG. 6 and content routing server 140. For example, the master route matrix may determine a prospective best cost route and the micro route matrix may determine an actual best cost route based on current information of the particular content delivery micro edge server 120 and neighboring content delivery micro edge servers 120. Content delivery micro edge server 120 may be (fully) aware of neighboring content delivery micro edge servers 120, and may be capable of detecting local capacity or neighboring capacity to make intelligent decisions on which content delivery micro edge server 120 is to fulfill a next transaction requested by a client device 102.

Figure 5:
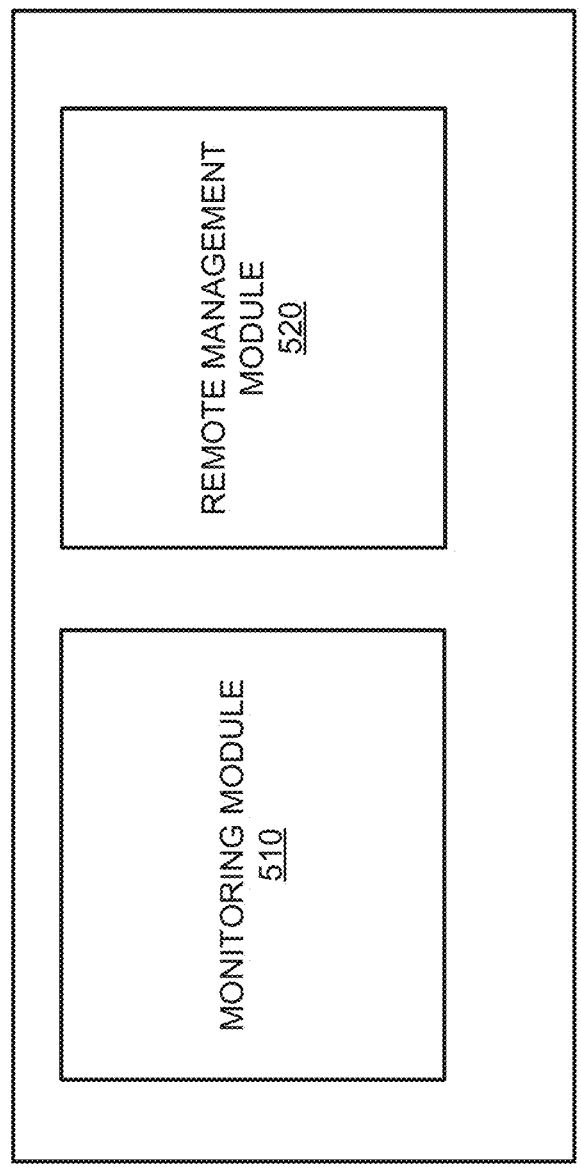
FIG. 5 depicts exemplary components of the content routing server of FIG. 1.

FIG. 5 is a functional block diagram of content delivery resource management server (CDRMS) 130. In one implementation, the functions described in connection with FIG. 5 may be performed by one or more components of device 200 (FIG. 2). As shown in FIG. 5, content delivery resource management server 130 may include monitoring module 510, and remote management module 520.

Content delivery resource management server 130 may be configures as a scalable system to monitor the health of each content delivery micro edge server 120, and maintain awareness of global resource capacity. Content delivery resource management server 130 may identify where content delivery micro edge servers 120 are located and particular capacities and capabilities associated with the content delivery micro edge servers 120. For example, content delivery resource management server 130 may determine a current capacity of the content delivery micro edge servers 120.

Monitoring module 510 may receive monitoring communication reported from the content delivery micro edge server 120. Monitoring module 510 may receive the monitoring communication via an encrypted network connection. Monitoring module 510 may monitor content delivery micro edge servers 120 to determine an operational status of the content delivery micro edge servers 120. The operational status may indicate whether the content delivery micro edge server 120 is on or off, whether the content delivery micro edge server is functioning at full or partial capacity (of expected content delivery micro edge server 120 capacity), whether the hosting web server for content delivery micro edge server 120 appears healthy (i.e., fully functional and accessing required resources), etc. For example, monitoring module 510 may query the content delivery micro edge servers 120 to determine whether the content delivery micro edge servers 120 are up and running. Monitoring module 510 may also determine a health (e.g., whether the content delivery micro edge servers 120 is functioning at expected capacity for network, storage, etc.) and state (e.g., whether the content delivery micro edge server 120 is on or the host entity has opted out of the CDN marketplace) of each of the content delivery micro edge servers 120.

Remote management module 520 may allow for remote management of web server applications, processes, configuration of each content delivery micro edge server 120. Remote management module 520 may provide a conduit to push new updates, upgrades, remote commands to the content delivery micro edge server 120.

According to an embodiment, remote management module 520 may exchange out of band communications with the host entity to adjust the terms of agreement for content delivery micro edge server 120. For example, in a particular embodiment, the remote management module 520 may receive requests to reduce or increase a portion of the total capacity of multi-entity partitioned web server 110 that participates in the CDN marketplace. For example, the content delivery micro edge server 120 may initially claim 80 percent of the total capacity of multi-entity partitioned web server 110. The host entity may wish to increase the host entity utilized web server capacity 310 and send a request to decrease the percentage used by the content delivery micro edge server 120 to 60 percent (and consequently double the total capacity available to the host entity).

Figure 6:
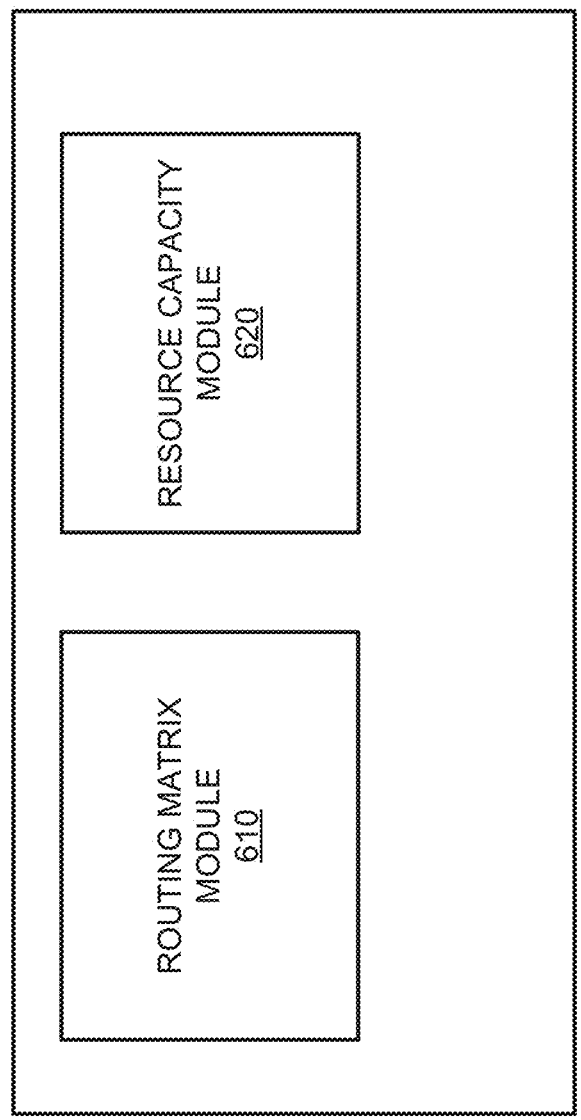
FIG. 6 depicts exemplary components of the content delivery resource management server of FIG. 1.

FIG. 6 is a functional block diagram of content routing server (CRS) 140. In one implementation, the functions described in connection with FIG. 6 may be performed by one or more components of device 200 (FIG. 2). As shown in FIG. 6, content routing server 140 may include routing matrix module 610, and resource capacity module 620.

Routing matrix module 610 may include a master route matrix in which the routing matrix module 610 may keep track of HTTP sessions associated with client devices 120. Routing matrix module 610 may re-route client devices 102 (i.e., user agents in client devices 102) to a new content delivery micro edge server 120 based on a best cost route for the content or application requested by the client device 102.

Routing matrix module 610 may be stored on a network associated with the service provider (e.g., network 160) and may perform session tracking as client devices 102 user agents request HTTP data from content delivery micro edge servers 120. Routing matrix module 610 may keep track of every session for the duration of HTTP Timeout window. In addition to session tracking, the routing matrix module 610 may proactively determine the content delivery micro edge server 120 that is to fulfill a next request (i.e., where the next request should be pulled from for the client device 102).

Routing matrix module 610 may determine a best cost route based on TCP Latency in milliseconds from source to destination and, in some instances, bandwidth availability. Routing matrix module 610 may open a best cost route first and subsequent next best cost routes if the current best cost route becomes unavailable (or is no longer the best cost route).

Routing matrix module 610 may track transactions between content delivery micro edge servers 120 and client device 102 in a master route matrix. In some instances, content delivery micro edge server 120 may be malfunctioning (i.e., unable to provide content delivery services) or web master may opt to not participate in content delivery services (i.e., turn off content delivery micro edge server 120). In these instances, the routing matrix module 610 may ensure that sessions (i.e., for content delivery from the content provider to client devices 102) are not compromised by re-directing requesting client devices 102 to the next best available content delivery micro edge server 120 in the vicinity (e.g., physical, geographical, logic) of the content delivery micro edge server 120 that has opted out of providing content delivery services to the requesting client device 102.

According to an embodiment, routing matrix module 610 may receive a reply from a content delivery micro edge server 120 to a request for content delivery services prior to the client device 102. In instances in which the content delivery micro edge server 120 does not fulfill the request, routing matrix module 610 may be able to seamlessly redirect the client device 102 to a next best available content delivery micro edge server 120.

Resource capacity module 620 may track available capacity of content delivery micro edge servers 120. For example, resource capacity module 620 may track the unused web server and/or bandwidth capacity of each content delivery micro edge server 120. Additionally, resource capacity module 620 may track particular content data and applications stored by each content delivery micro edge server 120. Further, resource capacity module 620 may track content delivery micro edge servers 120 based on particular capabilities associated with the content delivery micro edge server 120 (e.g., a number of concurrent users that the content delivery micro edge server 120 may be able to serve, formats the content delivery micro edge server 120 may be compatible with, etc.).

According to one embodiment, resource capacity module 620 may determine values associated with content delivery micro edge servers 120 based on the content delivery micro edge servers 120 capability (or actual observed results) to increase the quality of content delivery service to client devices 120. For example, in some instances, particular content delivery micro edge servers 120 may extend the area (i.e., geographical reach) of content delivery based on a geographical location of the particular content delivery micro edge servers 120. In other instances, the particular content delivery micro edge servers 120 may add enhanced capability to the content delivery network. In other instances, the particular content delivery micro edge servers 120 may add required redundancy to the content delivery network. The service provider may assign different values to the particular content delivery micro edge servers 120 based on fulfilling these criteria (and a relative extent) and use these values as a factor in determining payment for content delivery services. The service provider may thereby incentivize host entities to provide content delivery services in needed geographical locations and with particular capabilities.

Figure 7:
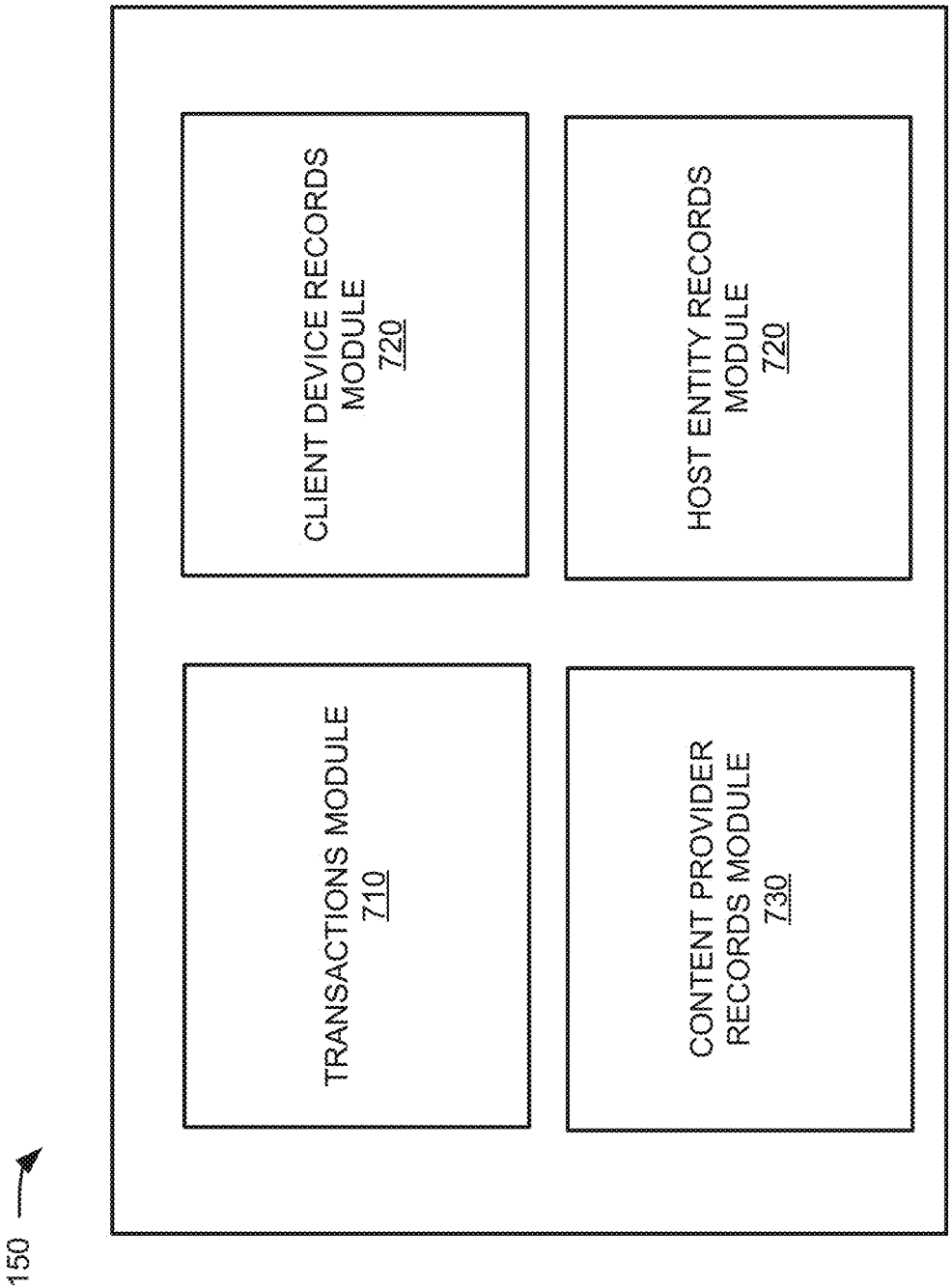
FIG. 7 depicts exemplary components of the transaction records and analysis server of FIG. 1.

FIG. 7 is a functional block diagram of transaction records and analysis server (TRAS) 150. In one implementation, the functions described in connection with FIG. 7 may be performed by one or more components of device 200 (FIG. 2). As shown in FIG. 7, transaction records and analysis server 150 may include transactions module 710, client device records module 720, a content provider records module 730, and a host entity records module 740.

Transaction records and analysis server 150 may harvest (e.g., request, receive, and/or store) transactions between client devices 102 and content delivery micro edge servers 120 in the content delivery network. Transaction records and analysis server 150 may include a data "warehouse" component that contains historical, verbose HTTP header information that may be used to derive reporting and analytics for content delivery services.

Transactions module 710 may capture verbose HTTP Header Information for each session for each client device 102 that uses content delivery services. Transactions module 710 may capture particular metrics for reporting and analytics purposes, including, for example, network bandwidth utilization, processing speeds, etc. Transactions module 710 may collect transactions and group transaction records based on geographic location, types of requests, etc.

Client device records module 720 may determine transaction records based on particular client devices 102. For example, client device records module 720 may group transactions on a basis of particular client devices 102. Client device records module 720 may allow analysis of TCP latency for client devices 102 over different spans of time.

Content provider records module 730 may determine transaction records based on particular content providers. Content provider records module 730 may allow access by content provider customers (e.g., a movie studio, video game studio, etc.) to data associated with content delivery micro edge servers 120 that deliver content or applications associated with the content provider customer.

Host entity records module 740 may determine transaction records based on particular host entities that provide content delivery micro edge servers 120. For example, client device records module 720 may allow analysis of TCP latency for particular host entities that provide content delivery micro edge servers 120. In some implementations, host entity records module 740 may track whether content delivery micro edge servers 120 associated with particular host entities achieve target metrics (e.g., processing speeds, etc.).

Figure 8:
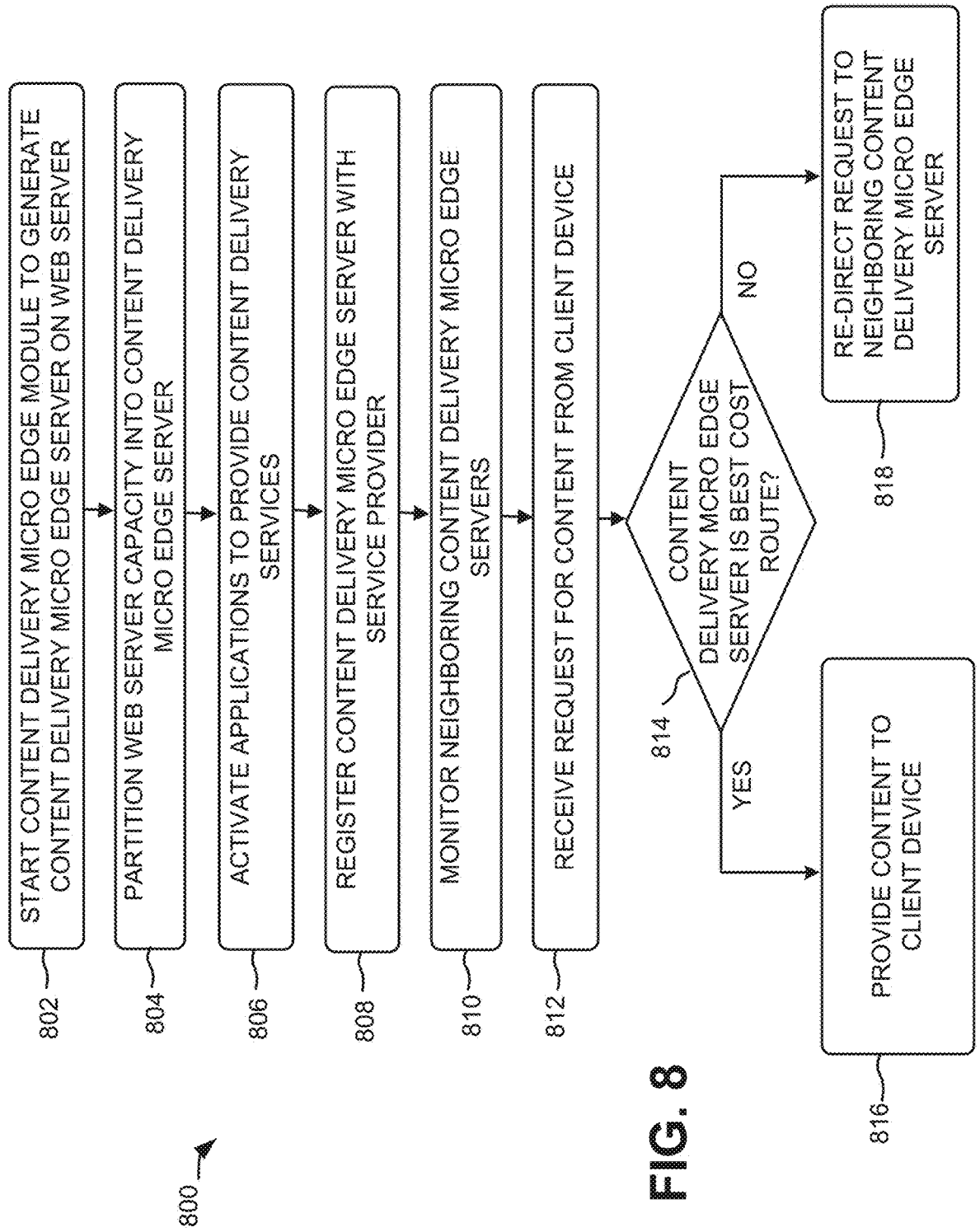
FIG. 8 is a flow chart of an exemplary process for providing content via a content delivery network that includes a plurality of content delivery micro edge servers hosted on multi-entity partitioned web servers according to implementations described herein.

FIG. 8 is a flow chart of an exemplary process 800 for providing content via a content delivery network that includes a plurality of content delivery micro edge servers hosted on multi-entity partitioned web servers according to implementations described herein. In one implementation, process 800 may be performed by content delivery micro edge server 120. In another implementation, some or all of process 800 may be performed by another device or group of devices, including or excluding content delivery micro edge server 120.

As shown in FIG. 8, process 800 may include starting up (or otherwise initializing) a content delivery micro edge server module to generate a content delivery micro edge server 120 on web server 110 (block 802). For example, web server 110 may include a content delivery micro edge server module (i.e., machine readable instructions that define the content delivery micro edge server and the content delivering (and protecting) properties of the content delivery micro edge server). The host entity may provide input to start up the content delivery micro edge server module on multi-entity partitioned web server 110. The host entity may receive a message (e.g., in a graphical user interface (GUI) of a host entity associated user device) at that time of an amount of web server capacity that is to be utilized by content delivery micro edge server 120). In other implementations the host entity may download the machine readable instructions for content delivery micro edge server 120 (i.e., content delivery micro edge server module) and then provide instructions to execute content delivery micro edge server 120.

Process 800 may include partitioning capacity of multi-entity partitioned web server 110 into content delivery micro edge server 120 (block 804). In some embodiments, the input provided by the host entity may include selection of a particular portion (e.g., a fixed size of web server capacity) or particular percentage of the total web server capacity of web server 110 that is to be partitioned into content delivery micro edge server 120. The web server, which prior to initialization of content delivery micro edge server 120 may have been partitioned for a single entity, may thereafter be partitioned for multiple entities (i.e., a "multi-entity partitioned" web server 110). In other implementations, the module may determine a current unused web server capacity of multi-entity partitioned web server 110 and "carve out" (or isolate) a predetermined percentage of the current unused web server capacity to be included in content delivery micro edge server 120.

Content delivery micro edge server 120 may activate applications to provide content delivery services (e.g., to provide particular content delivery functionality) (block 806). Content delivery micro edge server 120 may deploy particular application modules 450 to establish core functionality to support content delivery. Content delivery micro edge server 120 may also encrypt and generate a secure environment (secure from the host entity, client devices 102, additional parties, etc.) in which access to content (and/or applications) is protected.

Content delivery micro edge server 120 may communicate with the service provider to register content delivery micro edge server 120 with the service provider to provide content delivery services (block 808). For example, content delivery micro edge server 120 may establish communication and monitoring with the service provider. Content delivery micro edge server 120 may register with the service provider and the host entity may receive reference information associated with an account for content delivery micro edge server 120 in the CDN marketplace.

Content delivery micro edge server 120 may monitor neighboring content delivery micro edge server 120 (block 810). For example, content delivery micro edge server 120 may request and receive information regarding neighboring content delivery micro edge servers 120 from the neighboring content delivery micro edge servers 120 and from the core service provider network (e.g., from content delivery resource management server 130, content routing server 140, etc.).

Content delivery micro edge server 120 may receive a request for content and/or applications from a client device 102 (block 812). For example, content delivery micro edge server 120 may receive the request for content and/or applications based on routing information provided to client device 102 by content routing server 140.

Content delivery micro edge server 120 may determine whether content delivery micro edge server 120 provides a best cost route (or a better cost route between the content delivery micro edge server 120 and the neighboring content delivery micro edge servers 120) to deliver the content and/or applications to the requesting client device 102 (block 814). For example, content delivery micro edge server 120 may determine capabilities and capacities associated with the content delivery micro edge server 120 and neighboring content delivery micro edge servers 120. Content delivery micro edge server 120 may implement a micro route matrix and compare expected TCP latency, etc., of different routes (i.e., for particular content delivery micro edge server 120 to the requesting client device 102) to determine whether the request by the client device 102 is to be fulfilled by the content delivery micro edge server 120 or one of the neighboring content delivery micro edge servers 120.

In response to a determination that the route from the content delivery micro edge server 120 to the requesting client device 102 is the best cost route, content delivery micro edge server 120 may provide the content and/or application to the client device 102 (block 816). For example, content delivery micro edge server 120 may have previously cached the requested content and/or applications in a memory storage associated with content delivery micro edge server 120 (e.g., in storage 435). Alternatively, content delivery micro edge server 120 may request and cache the requested content and/or applications from the content provider (e.g., content delivery micro edge server 120 may communicate with the content provider via proxy module 455 to authenticate the user of client device 102 and transfer or copy the requested content from the content provider). In some instances, content delivery micro edge server 120 may receive the content and/or applications from neighboring content delivery micro edge servers 120.

In response to a determination that the route from the content delivery micro edge server 120 to the requesting client device 102 is not the best cost route, content delivery micro edge server 120 may re-direct the request to a neighboring content delivery micro edge server 120 (and not provide the content and/or application to the client device 102) (block 818). Content delivery micro edge server 120 may also check to ensure that a designated neighboring content delivery micro edge server 120 (the best cost route micro edge server 120) has fulfilled the request. If the designated neighboring content delivery micro edge server 120 has not fulfilled the request, content delivery micro edge server 120 may provide the content and/or application to the client device 102.

Systems and/or methods described herein may provide content via a content delivery network that includes a plurality of content delivery micro edge servers hosted on multi-entity partitioned web servers. The content delivery micro edge server may be a virtualized instance of an edge server that is operated by a service provider. The multi-entity partitioned web server may be a host web server that is operated by a host entity, which is separate (and different) than the service provider.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer implemented method, comprising:
    starting, by a processing device and based on instructions received from a host entity, a content delivery micro edge server module to generate a content delivery micro edge server on a web server, wherein the content delivery micro edge server is a virtualized edge server associated with a content delivery network operator and the web server is associated with the host entity that is different than the content delivery network operator;
    partitioning web server capacity of the web server into a predetermined level of capacity associated with the content delivery micro edge server and web server capacity, wherein the content delivery micro edge server module reserves web server capacity based on available capacity and utilized capacity;
    remotely controlling, by the content delivery network operator and not the host entity, applications, processes, and configuration of the content delivery micro edge server via an encrypted network connection, including:
        activating at least one application associated with the content delivery micro edge server to provide content delivery services;
        registering, with the content delivery network operator, the content delivery micro edge server to provide the content delivery services;
        receiving a request for content to be provided to a client device via a prospective best cost route determined by a master route matrix based on a transmission control protocol (TCP) latency as of a last-identified state of the content delivery micro edge server, and a TCP latency as of a last-identified state of at least one neighboring content delivery micro edge server, wherein the client device is associated with a third party to the host entity and the content delivery network operator;
        determining that the at least one neighboring content delivery micro edge server forms part of an actual best cost route for delivering the content to the client device, wherein the actual best cost route is further determined using a micro route matrix based on a comparison of a first expected TCP latency associated with the content delivery micro edge server, and a second expected TCP latency associated with the at least one neighboring content delivery micro edge server;
        re-directing, based on the determining, the request for content to the at least one neighboring content delivery micro edge server;
        receiving, by the at least one neighboring content delivery micro edge server, the content from a cache dedicated to the content delivery micro edge server; and
        delivering, by the at least one neighboring content delivery micro edge server, the content to the client device via the actual best cost route, wherein the actual best cost route does not include the content delivery micro edge server using the predetermined level of capacity; and
    terminating, by the processing device and based on instructions received from the host entity, the content delivery micro edge server module.

2. The computer implemented method of claim 1, wherein partitioning the web server into the predetermined level of capacity associated with the content delivery micro edge server further comprises:
    partitioning the web server based on a predetermined percentage of a total web server capacity of the web server.

3. The computer implemented method of claim 1, wherein partitioning the web server into the predetermined level of capacity associated with the content delivery micro edge server further comprises:
    determining a current unused capacity of the web server; and
    partitioning the web server based on a predetermined percentage of the current unused capacity of the web server.

4. The computer implemented method of claim 1, further comprising:
    receiving management instructions for the content delivery micro edge server via a dedicated management channel.

5. The computer implemented method of claim 1, wherein registering the content delivery micro edge server to provide content delivery services further comprises:
    registering the host entity to receive payment for content delivery services by the content delivery micro edge server in a content delivery marketplace.

6. The computer implemented method of claim 1, wherein the content delivery micro edge server appears as a single process to the host entity.

7. The computer implemented method of claim 1, wherein receiving the request for content further comprises:
    receiving the request for content via a routing server, wherein the routing server is configured to route the request for content among a plurality of content delivery micro edge servers based on a best cost route for delivering the content to the client device.

8. The computer implemented method of claim 1, wherein activating the at least one application further comprises:

activating at least one of a proxy application, a hypertext transfer protocol (HTTP) application, a transcode multiplexing application, or a scripting application.

9. The computer implemented method of claim 1, wherein activating the at least one application further comprises:
activating a security application,
wherein activating the security application includes generating a secure and encrypted environment in the content delivery micro edge server in which access to the content is protected with respect to the host entity and the client device.

10. The computer implemented method of claim 1, wherein partitioning the web server capacity further comprises:
partitioning random access memory (RAM), processor speed, and network utilization associated with the web server.

11. The computer implemented method of claim 1, further comprising:
monitoring communication between the content delivery micro edge server and the client device via another encrypted network connection.

12. A web server, comprising:
a memory to store a plurality of instructions; and
a processor to execute instructions in the memory to:
 start, based on first input instructions received from a host entity, a content delivery micro edge server module to generate a content delivery micro edge server on the web server, wherein the content delivery micro edge server is a virtualized edge server associated with a content delivery network operator and the web server is associated with the host entity that is different than the content delivery network operator, and wherein after the generation;
 partition web server capacity of the web server into a predetermined level of capacity associated with the content delivery micro edge server and web server capacity, wherein the content delivery micro edge server module reserves web server capacity based on available capacity and utilized capacity;
 control, based on management instructions received from the content delivery network operator and not the host entity, applications, processes, and configuration of the content delivery micro edge server via an encrypted network connection, wherein to control the applications, processes, and configuration of the content delivery micro edge server, the processor executes the instructions to:
  activate at least one application associated with the content delivery micro edge server to provide content delivery services;
  register, with the content delivery network operator, the content delivery micro edge server to provide the content delivery services;
  receive a request for content to be provided to a client device via a prospective best cost route determined by a master route matrix based on a transmission control protocol (TCP) latency as of a last-identified state of the content delivery micro edge server, and a TCP latency as of a last-identified state of at least one neighboring content delivery micro edge server, wherein the client device is associated with a third party to the host entity and the content delivery network operator;
  determine that the at least one neighboring content delivery micro edge server forms part of an actual best cost route for delivering the content to the client device, wherein the actual best cost route is further determined using a micro route matrix based on a comparison of an expected TCP latency associated with the content delivery micro edge server, and an expected TCP latency associated with the at least one neighboring content delivery micro edge server;
  re-direct the request for content to the at least one neighboring content delivery micro edge server;
  receive, by the at least one neighboring content delivery micro edge server, the content from a cache dedicated to the content delivery micro edge server; and
  deliver, by the at least one neighboring content delivery micro edge server, the content to the client device via an actual best cost route, wherein the actual best cost route does not include the content delivery micro edge server using the predetermined level of capacity; and
 terminate, based on second input instructions received from the host entity, the content delivery micro edge server module.

13. The web server of claim 12, wherein, when partitioning the web server into the predetermined level of capacity associated with the content delivery micro edge server, the processor is further to:
partition the web server based on a fixed portion of a total web server capacity of the web server.

14. The web server of claim 12, wherein, when registering the content delivery micro edge server to provide content delivery services, the processor is further to execute instructions in the memory to:
register the host entity to receive payment for content delivery services by the content delivery micro edge server in a content delivery marketplace.

15. The web server of claim 12, wherein the processor is further to execute instructions in the memory to:
identify the content delivery micro edge server as a single process to the host entity.

16. The web server of claim 12, wherein, when activating the at least one application, the processor is further to execute instructions in the memory to:
activate at least one of a proxy application, a hypertext transfer protocol (HTTP) application, a transcode multiplexing application, or a scripting application.

17. A system, comprising:
at least one web server, wherein the at least one web server comprises:
 a communication interface,
 a memory storing first instructions, and
 a first processor, wherein the first processor executes the first instructions to:
  start, based on input instructions received from a host entity, a content delivery micro edge server module to generate a content delivery micro edge server on the at least one web server, wherein the content delivery micro edge server is a virtualized edge server associated with a content delivery network operator and the at least one web server is associated with the host entity that is different than the content delivery network operator,
  partition web server capacity of the at least one web server into a predetermined level of capacity associated with the content delivery micro edge server and web server capacity, wherein the content delivery micro edge server module reserves capacity based on available capacity and utilized capacity, activate at least one application associated with the content delivery micro edge server to provide content delivery services, register, with the content delivery network operator, the content delivery micro edge server to provide the content delivery services, receive, via the communication interface, a request for content to be provided to a client device via a prospective best cost route determined by a master route matrix based on a transmission control protocol (TCP) latency as of a last-identified state of the content delivery micro edge server, and a TCP latency as of a last-identified state of at least one neighboring content delivery micro edge server, wherein the client device is associated with a third party to the host entity and the content delivery network operator, determine that the at least one neighboring content delivery micro edge server forms part of an actual best cost route for delivering the content to the client device, wherein the actual best cost route is further determined using a micro route matrix based on a comparison of an expected TCP latency associated with the content delivery micro edge server, and an expected TCP latency associated with the at least one neighboring content delivery micro edge server, re-direct the request for content to the at least one neighboring content delivery micro edge server, and receive, by the at least one neighboring content delivery micro edge server, the content from a cache dedicated to the content delivery micro edge server, and deliver, by the at least one neighboring content delivery micro edge server, the content to the client device via the actual best cost route, wherein the actual best cost route does not include the content delivery micro edge server using the predetermined level of capacity;

a content delivery resource management server including a second processor that executes second instructions to remotely manage the applications, processes, and configuration of the content delivery micro edge servers in each of the at least one web server;

a content routing server including a third processor that executes third instructions to route requests for content among the content delivery micro edge servers in each of at least one web server; and a transaction records and analysis server including a fourth processor that executes fourth instructions to store records of transactions between client devices and the content delivery micro edge servers.

18. The system of claim 17, wherein to partition the web server capacity, the first processor further executes the first instructions to partition the web server capacity based on a fixed portion of a total web server capacity of the web server.

19. The system of claim 17, wherein to activate the at least one application, the first processor further executes the first instructions to:

activate at least one of a proxy application, a hypertext transfer protocol (HTTP) application, a transcode multiplexing application, or a scripting application.

* * * * *